(12) United States Patent
Nicholson et al.

(10) Patent No.: US 10,740,423 B2
(45) Date of Patent: Aug. 11, 2020

(54) VISUAL DATA ASSOCIATED WITH A QUERY

(71) Applicant: Lenovo (Singapore) Pte. Ltd., Singapore (SG)

(72) Inventors: John Weldon Nicholson, Cary, NC (US); Daryl Cromer, Cary, NC (US); Scott Patrick DeBates, Crystal Lake, IL (US); Ming Qian, Cary, NC (US); Song Wang, Cary, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 402 days.

(21) Appl. No.: 15/606,617

(22) Filed: May 26, 2017

(65) Prior Publication Data
US 2018/0341654 A1    Nov. 29, 2018

(51) Int. Cl.
| G06F 16/9538 | (2019.01) |
| H04W 4/02 | (2018.01) |
| G06F 16/487 | (2019.01) |
| G06F 16/9038 | (2019.01) |
| G06K 9/72 | (2006.01) |
| G06F 16/9535 | (2019.01) |
| G06F 16/432 | (2019.01) |

(52) U.S. Cl.
CPC ........ *G06F 16/9538* (2019.01); *G06F 16/487* (2019.01); *G06F 16/9038* (2019.01); *G06F 16/9535* (2019.01); *G06K 9/72* (2013.01); *H04W 4/02* (2013.01); *G06F 16/433* (2019.01)

(58) Field of Classification Search
CPC .......................... G06F 16/9038; G06F 16/9538
See application file for complete search history.

(56) References Cited

U.S. PATENT DOCUMENTS

| 9,081,833 | B1 * | 7/2015 | Unger | G06Q 50/01 |
| 2008/0005067 | A1 * | 1/2008 | Dumais | G06F 16/24575 |
| 2011/0113315 | A1 * | 5/2011 | Datha | G06F 16/4393 |
| | | | | 715/202 |
| 2013/0275418 | A1 * | 10/2013 | Kumar, V | G06T 3/40 |
| | | | | 707/723 |
| 2015/0161764 | A1 * | 6/2015 | Henry | G06T 3/40 |
| | | | | 345/661 |
| 2016/0210289 | A1 * | 7/2016 | Esinovskaya | G06F 16/951 |
| 2017/0262164 | A1 * | 9/2017 | Jain | G06F 3/0482 |

* cited by examiner

*Primary Examiner* — William Spieler
(74) *Attorney, Agent, or Firm* — Ference & Associates LLC

(57) ABSTRACT

One embodiment provides a method, including: receiving, at an information handling device, user input comprising a query from a user, wherein the query does not comprise an explicit request for visual data; identifying, based upon results of the query, that visual data is associated with the query; and providing, based on the identifying, output associated with the identified visual data. Other aspects are described and claimed.

12 Claims, 3 Drawing Sheets

VISUAL DATA ASSOCIATED WITH A QUERY

BACKGROUND

Information handling devices ("devices"), for example smart phones, tablet devices, laptop computers, personal computers, and the like, may be capable of receiving user command inputs and providing outputs responsive to the input. Generally, a user interacts with a voice input module, for example embodied in a personal assistant through use of natural language. This style of interface allows a device to receive voice inputs from a user, process those inputs, and perform the user's desired actions by carrying out the task itself or delegating user requests to a desired application.

BRIEF SUMMARY

In summary, one aspect provides a method, comprising: receiving, at an information handling device, user input comprising a query from a user, wherein the query does not comprise an explicit request for visual data; identifying, based upon results of the query, that visual data is associated with the query; and providing, based on the identifying, output associated with the identified visual data.

Another aspect provides an information handling device, comprising: a processor; a memory device that stores instructions executable by the processor to: receive user input comprising a query from a user, wherein the query does not comprise an explicit request for visual data; identify, based upon results of the query, that visual data is associated with the query; and provide, based on the identifying, output associated with the identified visual data.

A further aspect provides a product, comprising: a storage device that stores code, the code being executable by a processor and comprising: code that receives user input comprising a query from a user, wherein the query does not comprise an explicit request for visual data; code that identifies, based upon results of the query, that visual data is associated with the query; and code that provides, based on the code that identifies, output associated with the identified visual data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
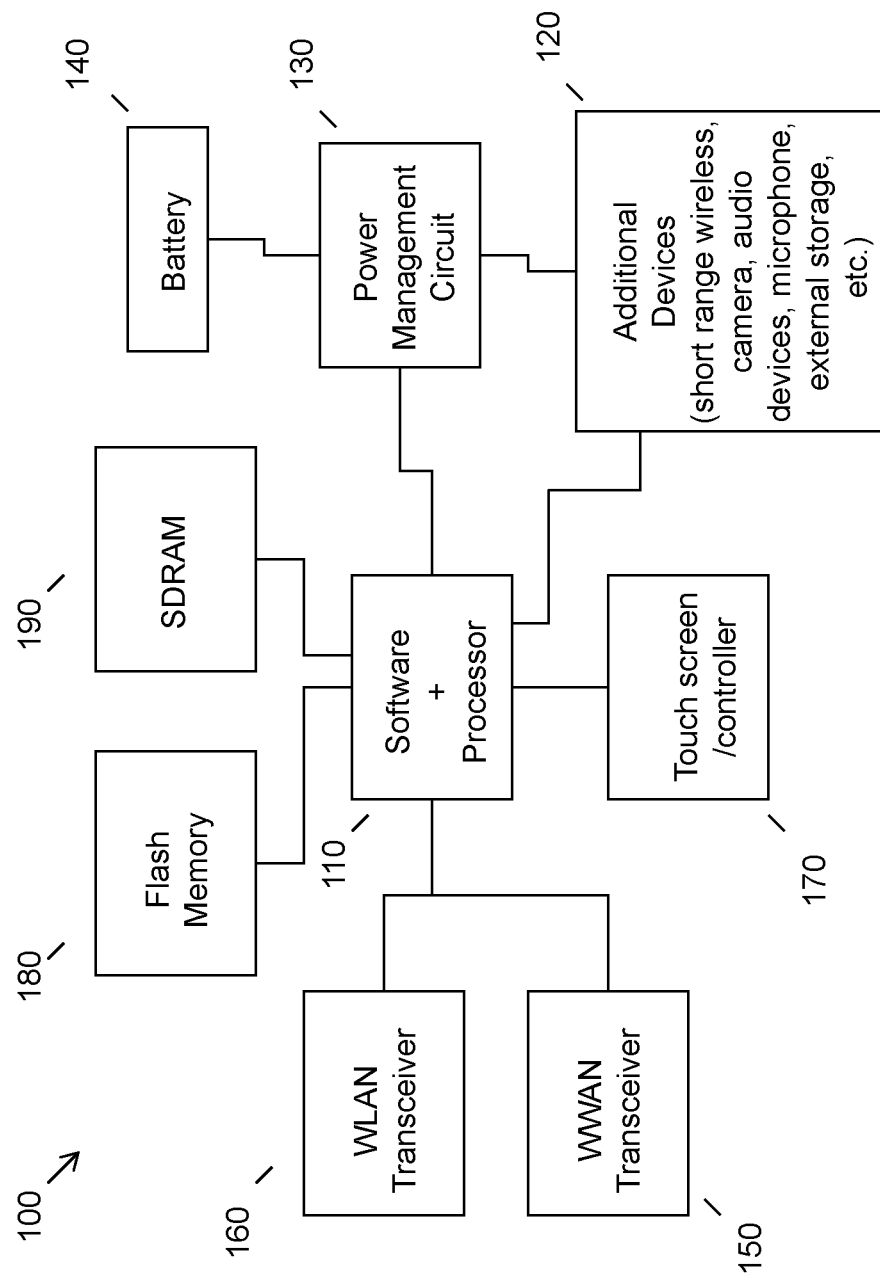
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide responsive outputs to a variety of different types of user inputs. For example, responsive to receiving the user-provided query, "what is the weather like?" a digital assistant may provide the response "stormy".

Conventionally, digital assistants provide responses that are directly associated with a user's command. For example, if a user provides a request or query that does not explicitly request a digital assistant to display an image, or another piece of visual data, then the digital assistant will not include any type of visual data in its output. However, certain outputs may be optimized by including some type of visual data in the output response. For example, in the aforementioned weather example, although the user did not explicitly request to see a weather related radar map, displaying such a map or querying the user whether they were interested in seeing a radar map may optimize the output response by providing the user with additional information.

Existing solutions may just mention that additional data exists. For example, if a user asks the digital assistant "what are the newest social headlines," the digital assistant may respond with a response similar to "there is a viral video circulating on the internet." However, these existing solutions are unable to independently determine that a user may benefit from provision of visual data.

Accordingly, an embodiment provides a method for providing output comprising visual data related to a user's query. In an embodiment, user input comprising a query may be received from at least one user at a device. The query may be any query that does not include an explicit request to display visual data (e.g., where an explicit request may be a request such as "show me this image", etc.). Based on the results of the query, an embodiment may identify visual data associated with the query that a user may find helpful and/or relevant to their original query. An embodiment may then provide output associated with the identified visual data to the user (e.g., output querying the user whether they want the identified visual data displayed, automatically displaying the identified visual data, etc.). Such a method may enable users to receive visual information that they may not have thought to ask for in their original query.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
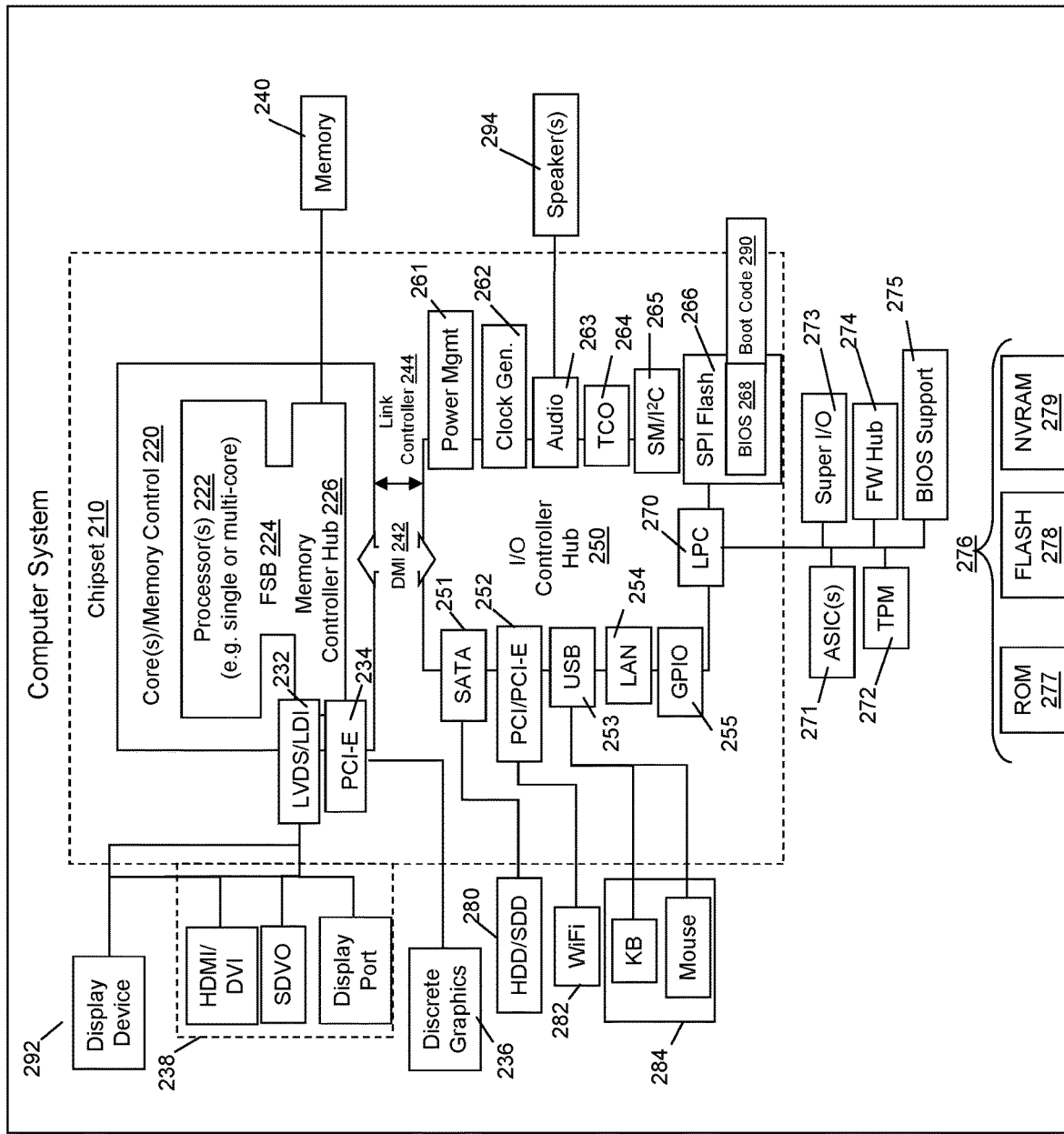
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
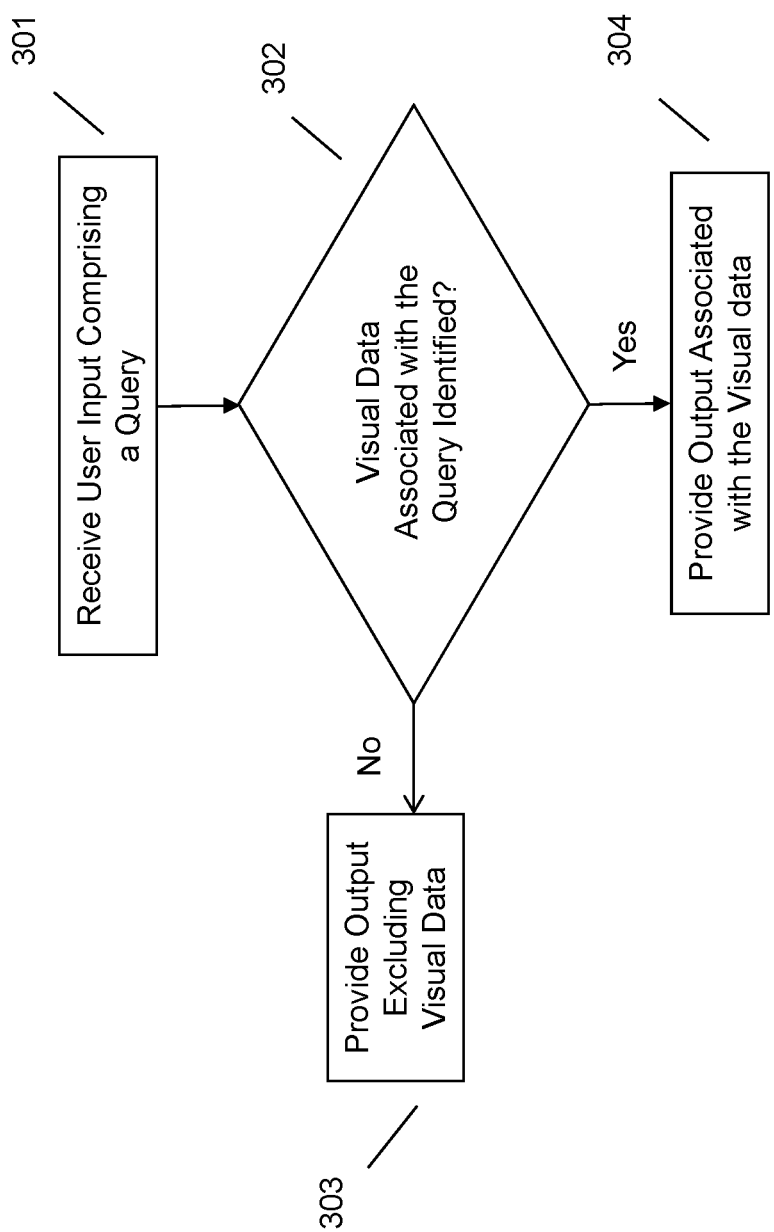
FIG. 3 illustrates an example method of providing output associated with visual data related to a user's query.

Referring now to FIG. 3, an embodiment may identify visual data related to a user's query and subsequently provide output associated with that visual data. At 301, an embodiment may receive user input. The input may be received at an input device (e.g., audio capture device, image capture device, video capture device, physical keyboard, on-screen keyboard, a digital assistant, etc.) and may be provided by any known method of providing input to an electronic device (e.g., voice input, gesture input, touch input, text input, etc.). In an embodiment, the input may be received at an electronic device that contains a display screen. For ease of readability, the majority of the discussion herein will involve an electronic device with a display screen (e.g., a smart phone, a tablet, laptop computer etc.) and an input method comprising voice input provided to at least one audio capture device associated with the electronic device (e.g., a microphone, etc.). However, it should be understood that generally any user input method may be utilized and that the input may be provided to devices with or without display screens. Additionally, the device may not have an integral display, but, rather may have an accessible display. For example, the electronic device may be a smart band without a display, but the band may be electronically coupled to a smart phone which does have a display.

In an embodiment, the user input may be any type of input such as a command input, query input, and the like. Solely for ease of readability, the remaining discussion will use the term "query" input; however, this input type is not intended to be limiting and other input types may be used. In an embodiment, the query input may not comprise an explicit request to provide visual data. For example, a user may provide one of the following queries: "what is the weather like?", "what are the top headlines?", "tell me appointments on my calendar", and the like. None of the aforementioned queries explicitly request that the device, or a digital assistant disposed on the device, provide visual data to a user.

At 302, an embodiment may identify visual data associated with the query. For example, during or after processing of the query, an embodiment may identify that some related queries or results of the query may include visual data. In an embodiment, the visual data may comprise images, video, graphs, etc. In an embodiment, in order to attain relevant visual data, an embodiment may run a user query through an image search engine. For example, a vocally provided user query may be analyzed and parsed to attain the various terms and/or words that make up the query. An embodiment may then run the user query through an image search engine in order to attain a plurality of images that may be related to the query. As another example, an embodiment may identify related queries that specifically request visual data. As an example, if a user provides a query about the weather, an embodiment may identify that a related query may include a request for an image of the radar.

As a further example, an embodiment may identify possible follow-up queries related to the result of the original query. Using the weather example presented above, the embodiment may identify that the result of the requested query is "stormy." The embodiment may also identify that a typical follow-up query to stormy weather is a request for displaying the radar. Accordingly, an embodiment may identify the display of the radar as possible visual data that can be displayed in response to the original query. Other methods may be used to find relevant visual data that are not mentioned here but that are well-known in the art. For example, in an embodiment, the attained visual data may be analyzed to determine identification characteristics associated with the visual data. For example, an embodiment may identify any metadata associated with a piece of visual data (e.g., an image, etc.) and then determine, based on the metadata, if the piece of visual data is associated with the user's query.

Responsive to identifying, at 302, visual data associated with the query, and embodiment may provide, at 304, output associated with the visual data. In an embodiment, the output may be audio output, visual output, haptic output, a combination thereof, or the like. In an embodiment, the audible output may be provided though a speaker, another output device, and the like. In an embodiment, the visual output may be provided through a display screen, another display device, and the like. In an embodiment, the output device may be integral to the device or may be located on another device. In the case of the latter, the output device may be connected via a wireless or wired connection to the device. For example, a smart speaker may provide instructions to provide visual output through an operatively coupled smart watch.

In an embodiment, the output may comprise output containing the identified visual data. In an embodiment, the output may only comprise the visual data. For example, responsive to the user query "what is the weather like?" an embodiment may display a radar map associated with the current weather. Alternatively, an embodiment may comprise the visual data along with additional types of data. For example, using the aforementioned example, an embodiment may display a radar map while also providing the additional audible output "it is currently raining". In an embodiment, the output may comprise a query asking the user if they would like to see the identified visual data. For example, responsive to the user query "what is the weather like" an embodiment may provide, as part of or as all of the output, the response "I have found a radar map for your area, would you like to see it?"

In situations where multiple pieces of visual data are identified, an embodiment may determine which of the pieces of visual data to display. For example, responsive to the user query, "what is the movie Julia Roberts is most famous for?", an embodiment may identify that Pretty Woman is the movie Julia Roberts is best known for and may identify multiple pieces of visual data related to Pretty Woman (e.g., movie posters, movies scenes of Julia Roberts in Pretty Woman, etc.). An embodiment may then determine which of those pieces of visual data best relate to the user's query. For example, an embodiment may determine that the movie poster may provide a better indication as to the movie Julia Roberts is best known for than a scene from Pretty Woman without any other context.

An embodiment may learn to automatically include visual data in the output based upon prior interactions with a user. For example, if a user previously provided the query "what is the weather like" and then subsequently responded in the affirmative to a device's output asking if the user wanted to see a radar map, an embodiment may store this interaction (e.g., in an integral or remote accessible database, etc.) and then automatically display the radar map responsive to receiving the same, or substantially similar, query. In an embodiment, the device may store the interaction only after a user has provided the same or similar response N number of times. For example, using the aforementioned example, if the user asks to see a radar map on three separate occasions, then the device may determine that a display of the radar map should be part of the output. In an embodiment, the N-threshold may be configured by a user or may be pre-configured (e.g., by the manufacturer and/or programmer, etc.).

In determining whether to provide or find visual data related to the query, an embodiment may determine a context associated with the user. For example, the context may be related to a user's location (e.g., in the car, in the office, etc.), time of day (e.g., morning, night, etc.), and the like. The context may be determined by accessing data associated with at least one of a variety of different data sources such as GPS data, calendar data, time/date data, light sensor data, accelerometer data, and the like.

In some instances, a device may determine that a user is associated with a context that is not appropriate for viewing visual data. For example, an embodiment may determine that a user is interacting with a device (e.g., providing audible queries to the device, etc.) while driving. In another example, an embodiment may identify (e.g., by analyzing the wording of the query, analyzing the potential visual data associated with the query, etc.) that the query and/or output may be associated with a context that is not necessarily appropriate for work. In these scenarios, although a device may identify visual data that is associated with a user's query, an embodiment may determine that the user is not associated with an acceptable visual data viewing context and may provide output associated with that determination. For example, the device may delay displaying the visual data until it has determined that the user is associated with an acceptable visual data viewing context (e.g., when a user has stopped driving, a user has left work, etc.). Additionally, and/or alternatively, the device may provide output explaining that the visual data will be displayed when the user is associated with an acceptable visual data viewing context (e.g., the device may output "I will display the image to you when you are no longer driving", "I will display the image to you when you are no longer at work", etc.).

During the provision or attempted provision of the visual data, an embodiment may determine a configuration associated with the device. In an embodiment, the configuration may be related to a device's orientation (e.g., device laying on surface with the face up, down, etc.) a viewability of the display (e.g., is the display covered with a protective cover, is the display in a non-viewable location such as a pocket, etc.), a combination thereof, and the like. An embodiment may thereafter provide output based on the configuration determination. For example, a user may be interacting with a tablet that has a protective cover covering the display. Responsive to receiving a user query and identifying visual data associated with the query, an embodiment may provide output similar to the following "I found an image that you may be interested in, please remove the cover to see it".

Responsive to identifying, at 302, that there is no visual data associated with the query, an embodiment may provide, at 303, output excluding any visual data. In an embodiment, the output excluding the visual data may comprise output associated with conventional output methods. In another embodiment, the output may include a notification that visual data was not identified. For example, responsive to not identifying any visual data associated with a user's query, an embodiment may audibly provide the natural language output "No images were found that relate to your query".

The various embodiments described herein thus represent a technical improvement to conventional output techniques. Using the techniques described herein, an embodiment may identify visual data that is associated with a user's query and then provide output associated with that visual data. Such techniques enable users to receive additional visual data that they may not have thought to ask for when providing their initial query.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, user input comprising a query from a user, wherein the query does not comprise an explicit request for visual data;
identifying, based upon results of the query, that visual data is associated with the query;
determining, using a processor, whether the user is associated with a visual data viewing context and whether the information handling device is associated with a visual data viewing configuration;
providing, responsive to determining that the user is associated with the visual data viewing context and that the information handling device is associated with the visual data viewing configuration, visual output associated with the visual data; and
providing, responsive to determining that the user is not associated with the visual data viewing context or that the information handling device is not associated with the visual data viewing configuration, a notification to the user.

2. The method of claim 1, wherein the determining whether the user is associated with a visual data viewing context comprises determining a location of the user.

3. The method of claim 1, wherein the providing output comprises displaying the identified visual data on a display screen associated with the information handling device.

4. The method of claim 1, wherein the providing comprises querying the user.

5. The method of claim 1, wherein the provided output is based upon a user selection and further comprising associating the provided output with the user and the received query.

6. The method of claim 5, wherein, upon receipt of a subsequent user query similar to the received query, the providing comprises providing output similar to the provided output without additional user input.

7. An information handling device, comprising:
a processor;
a memory device that stores instructions executable by the processor to:
receive user input comprising a query from a user, wherein the query does not comprise an explicit request for visual data;
identify, based upon results of the query, that visual data is associated with the query;
determine whether the user is associated with a visual data viewing context and whether the information handling device is associated with a visual data viewing configuration;
provide, responsive to determining that the user is associated with the visual data viewing context and that the information handling device is associated with the visual data viewing configuration, visual output associated with the visual data; and
provide responsive to determining that the user is not associated with the visual data viewing context or that the information handling device is not associated with the visual data viewing configuration, a notification to the user.

8. The information handling device of claim 7, wherein the instructions executable by the processor to determine whether the user is associated with the visual viewing context comprises instructions executable by the processor to determine a location of the user.

9. The information handling device of claim 7, wherein the instructions executable by the processor to provide out comprise instructions executable by the processor to display the identified visual data on a display screen associated with the information handling device.

10. The information handling device of claim 7, wherein the instructions executable by the processor to provide comprise instructions executable by the processor to query the user.

11. The information handling device of claim 7, wherein the provided output is based upon a user selection and wherein the instructions are further executable by the processor to associate the provided output with the user and the received query.

12. A product, comprising:
a storage device that stores code, the code being executable by a processor and comprising:
code that receives user input comprising a query from a user, wherein the query does not comprise an explicit request for visual data;
code that identifies, based upon results of the query, that visual data is associated with the query;
code that determines whether the user is associated with a visual data viewing context and whether the information handling device is associated with a visual data viewing configuration;
code that provides, responsive to determining that the user is associated with the visual data viewing context and that the information handling device is associated with the visual data viewing configuration, visual output associated with the visual data; and
code that provides, responsive to determining that the user is not associated with the visual data viewing context or that the information handling device is not associated with the visual data viewing configuration, a notification to the user.

* * * * *